July 29, 1947.   J. A. MERRILL   2,424,701
FUEL TANK CASING
Filed Feb. 24, 1941
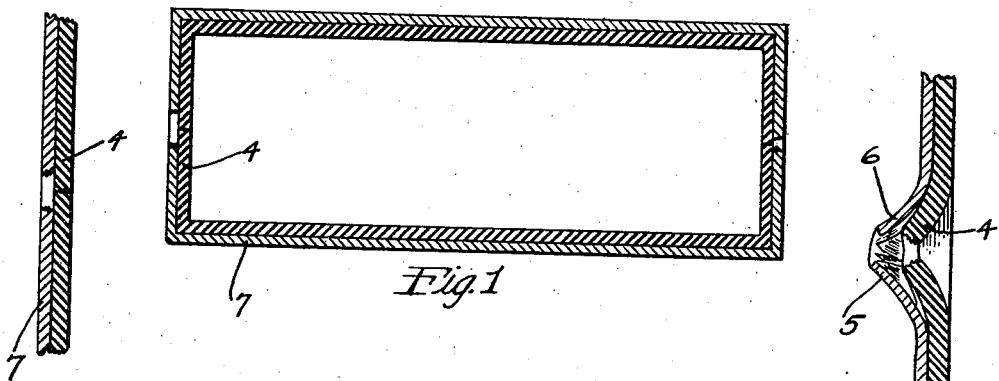
Fig.1
Fig.2   Fig.3
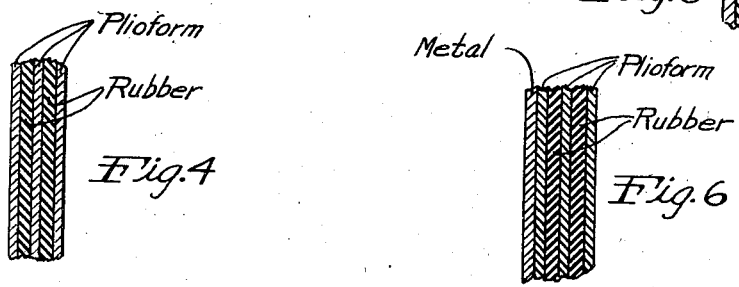
Fig.4   Fig.6
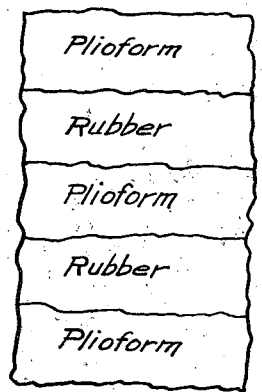
Fig.5
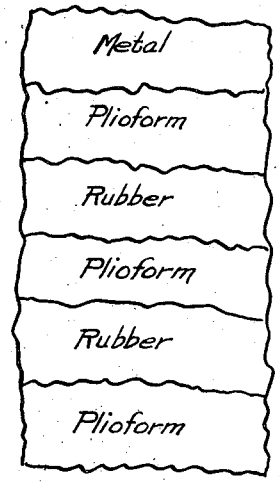
Fig.7
Inventor
James A. Merrill
Attorney

UNITED STATES PATENT OFFICE 2,424,701

FUEL TANK CASING

James A. Merrill, Barberton, Ohio, assignor to Wingfoot Corporation, Akron, Ohio, a corporation of Delaware Application February 24, 1941, Serial No. 380,409

4 Claims. (Cl. 154—43.5)

This invention relates to a casing for tanks intended to contain liquids and, particularly, to tanks for hydrocarbon liquids exposed to conditions under which the tanks may be punctured as, for example, war plane installations.

In the construction of fuel tanks for airplanes, it has been difficult to provide a tank which will not lose its contents rapidly when punctured. This problem is acute with respect to war planes which are exposed to gun fire from the enemy and hence must be equipped with means which will prevent or at least minimize loss of fuel through bullet holes in the fuel tanks. Any armor for the tanks must be comparatively light since an increase in weight of the plane cuts down the useful load which the plane can carry. The present invention aims to provide a fuel tank of improved characteristics which involves no great increase in weight and yet cuts down the loss of fuel attendant upon puncture.

It is, accordingly, an object of the invention to provide tanks for liquids having the property of self-sealing readily upon puncture. Another object of the invention is to provide a fuel tank for airplanes in which the loss of fuel through bullet holes is greatly reduced. Other objects will in part be obvious and will in part appear hereinafter.

In the accompanying drawings, forming part of the specification,

Figure 1 is a vertical section through a fuel tank of the improved type;

Figure 2 is a section through a punctured wall of a fuel tank which embodies the invention;

Figure 3 is a section through a wall of a fuel tank which has not been constructed according to the present invention;

Fig. 4 is an enlarged section through a liner made up in accordance with the invention;

Fig. 5 is a plan view of the liner in Fig. 4 broken away to show the various plies;

Fig. 6 is a view similar to Fig. 4 of a liner associated with a metal covering; and Fig. 7 is a plan view of the liner of Fig. 6 broken away to show the various plies.

Heretofore, fuel tanks for airplanes have been constructed with a metal shell enclosing a liner or some self-sealing material, such as uncured or semi-cured rubber, and usually having a facing of synthetic rubber next to the fuel. Such self-sealing liners are necessarily rather soft and flexible and hence, offer no resistance to the hydrostatic head of the fuel in the tank or against surges caused by a bullet passing therethrough. Ordinarily, the outer metallic shell affords the necessary strength to maintain the inner liner in position. However, when a projectile pierces the tank, the projectile, while usually making a clear hole upon entry, commences to yaw and tumble due to the resistance it encounters in entering the tank and passing through the liquid therein. As a consequence, it is likely to leave the tank at an angle to its line of flight or even broadside and thus rip a jagged hole in the liner and shell. Under these conditions, the metal of the shell will be flared and bulged and will offer no support for the liner at the point of puncture. The liner then has a tendency to be forced into the flared opening in the metal shell and to be held in this position by the hydrostatic head of the fuel behind it. Under such circumstances, the puncture in the liner will be held distended making it difficult or impossible for the hole to seal up and considerable gasoline or lubricating oil may be lost, thus forcing the plane to return to its base before its mission has been accomplished or resulting in loss of the plane.

The present invention overcomes this defect by providing, in place of the metal shell, a shell of some composition which is substantially incapable of flaring but is, instead, punched through by the bullet or other projectile, leaving the wall of the shell in substantially the same plane as it originally occupied. The effect of this will be immediately apparent by comparison of Figures 2 and 3 of the drawing, the liner 4 in Figure 3 being protruded into the flaring hole 5 in the metal casing 6, whereas that in Figure 2 is maintained substantially in its normal plane by the composition casing 7, which has been pierced but not deformed.

Among the materials having the desired properties may be mentioned "Plioform" (a registered trade-mark of the Goodyear Tire & Rubber Company), and similar rubber derivatives, such as cyclized rubber, mixtures of rubber and cyclized rubber, e. g., rubber and "Plioform," and a laminated structure made up of layers of rubber and layers of cyclized rubber, such as "Plioform." "Plioform" is a rubber derivative having the probable composition $(C_5H_8)_x$ in which more carbon atoms are directly connected than in rubber. It may be prepared by treating milled rubber in a solvent, such as benzene, with tin tetrachloride or other halides of amphoteric metals, such as chromic chloride, ferric chloride, aluminum chloride, etc. The reaction between the benzene cement and the halide of an amphoteric metal is conducted for such length of time as will produce a final product of the desired hardness upon quenching. When this point is reached, the reaction mass is quenched in a large volume of water and the solvent is removed by steam distillation, leaving a powder which may be milled or dissolved and spread to form a sheet.

Other rubber derivatives suitable for the purposes of the invention may be prepared by reacting a solution of rubber with one of the above mentioned chlorides of amphoteric metals in the presence of hydrochloric acid to yield a rubber derivative which contains chlorine. Also, the reaction products of rubber and phenol- or toluene-sulfonic acids and the like may be used, these reaction products being cyclized rubber compositions.

As mentioned, a suitable shell for self-sealing fuel tanks may be prepared from the "Plioform" alone or from the chlorine-containing derivative of rubber but, preferably, the tank walls are made from mixtures of the rubber derivative and rubber, suitable proportions being 30% of rubber and 70% of the rubber derivative such as "Plioform." These may be mixed on a rubber mill or the rubber and the derivative may be dissolved in a common solvent, such as benzene, and co-precipitated. The precipitate will be thereafter milled to form a sheet. Another effective tank wall may be prepared by laminating sheets of "Plioform" or other rubber derivative of sufficient hardness and rubber; for example, a layer of unvulcanized rubber may be laminated on both sides with sheets of "Plioform" which are integrally bonded therewith. The sheets containing rubber, either mixed with the "Plioform" or laminated therewith, are preferably vulcanized, appropriate vulcanizing ingredients, such as sulfur, zinc oxide, carbon black and mercaptobenzothiazole being added to the rubber before the sheet is formed. These sheets serve to enclose and support the self-sealing layer of the fuel cell, this latter being composed of unvulcanized natural rubber or gum stock, which is preferably milled to insure greater softness and solubility.

A tank was constructed consisting of a self-sealing liner and a casing of sheets made up of a ⅛ inch thickness of rubber which had been press cured and laminated with 1/16" sheets of "Plioform" integrally bonded to each side of the rubber during the cure. The tank was filled ¾ full with gasoline and then 50-calibre machine gun bullets were fired into it. The outside of the tank remained dry during the test, although slight seepage occurred for a moment at one puncture. Of course, some bulging may occur upon puncture of the protective shell characterizing tanks constructed in accordance with the principles of the invention but no flaring is produced and such bulging as may take place is not sufficient to allow the self-sealing liner to distend greatly at the point of puncture. Hence, the puncture will close promptly.

It will be understood that the invention may be embodied in tanks which consist of an inner self-sealing liner and an outer casing of one of the foregoing materials, such as mixed rubber and "Plioform" or laminated rubber and "Plioform," or the improved casing may be used in conjunction with a metal liner which encloses it, the non-flaring casing lying between the self-sealing liner and the outer metallic shell, or, the soft liner and the protecting casing may be placed within an airplane wing where the wing surfaces and bulkheads will constitute a metallic protection serving to lessen the impact of or deflect projectiles approaching the tank.

While there have been described above the preferred embodiments of the invention, it will be apparent to those skilled in the art that various modifications and changes may be made therein without departing from the spirit of the invention or from the scope of the appended claims.

I claim:

1. A leak-proof container for liquid hydrocarbons comprising a liner embodying material capable of self-sealing after puncture by a projectile and a shell enclosing said liner composed of a rigid and elastic sheet of a mixture of rubber and cyclized rubber.

2. A leak-proof container for liquid hydrocarbons comprising a liner composed of material capable of self-sealing after puncture by a projectile and a shell enclosing said liner composed of a rigid and elastic sheet of a mixture of about 30% of a rubber and about 70% of cyclized rubber.

3. A leak-proof container for liquid hydrocarbons comprising a liner composed of material capable of self-sealing after puncture by a projectile and a shell enclosing said liner consisting of a layer of rubber laminated on each side with a mixture of about 30% of rubber and about 70% of cyclized rubber to constitute a rigid and elastic sheet.

4. A leak-proof container for liquid hydrocarbons comprising a liner embodying material capable of self-sealing after puncture by a projectile and a shell enclosing said liner embodying a rigid and elastic composition of rubber and cyclized rubber.

JAMES A. MERRILL.

REFERENCES CITED

The following references are of record in the file of this patent:

UNITED STATES PATENTS

| Number | Name | Date |
|---|---|---|
| 1,899,067 | Trumbull | Feb. 28, 1933 |
| 2,039,401 | Foges | May 5, 1936 |
| 1,386,791 | Murdock | Aug. 9, 1921 |
| 1,397,383 | Macbeth | Nov. 15, 1921 |
| 1,297,305 | Thacher | Mar. 11, 1929 |
| 2,188,286 | Merrill | Jan. 23, 1940 |
| 2,063,685 | Lane | Dec. 8, 1936 |
| 2,090,717 | Young | Aug. 24, 1937 |
| 2,120,567 | Merrill | June 14, 1938 |

FOREIGN PATENTS

| Number | Country | Date |
|---|---|---|
| 716,135 | France | Oct. 5, 1931 |
| 306,974 | Great Britain | May 1, 1930 |
| 657,597 | France | May 26, 1929 |